United States Patent
Walters et al.

[11] Patent Number: 6,077,035
[45] Date of Patent: Jun. 20, 2000

[54] DEFLECTOR FOR CONTROLLING ENTRY OF COOLING AIR LEAKAGE INTO THE GASPATH OF A GAS TURBINE ENGINE

[75] Inventors: Cameron Todd Walters, Newmarket; Valerio Valentini, Montreal, both of Canada

[73] Assignee: Pratt & Whitney Canada Corp., Longueuil, Canada

[21] Appl. No.: 09/049,003

[22] Filed: Mar. 27, 1998

[51] Int. Cl.⁷ .................................................. F01D 11/00
[52] U.S. Cl. .................. 415/115; 415/116; 415/173.5; 415/173.7; 415/914; 416/193 A
[58] Field of Search ..................... 415/115, 116, 415/173.5, 173.7, 174.5, 914; 416/193 A, 220 R, 248

[56] References Cited

U.S. PATENT DOCUMENTS

| | | |
|---|---|---|
| 3,609,057 | 9/1971 | Radtke . |
| 4,192,633 | 3/1980 | Herzner . |
| 4,348,157 | 9/1982 | Campbell et al. . |
| 4,422,827 | 12/1983 | Buxe et al. . |
| 4,507,052 | 3/1985 | Thompson . |
| 4,523,890 | 6/1985 | Thompson . |
| 4,668,167 | 5/1987 | Le Maoût et al. . |
| 4,761,116 | 8/1988 | Braddy et al. . |
| 4,869,640 | 9/1989 | Schwarz et al. . |
| 5,142,859 | 9/1992 | Glezer et al. ............................ 415/116 |
| 5,211,533 | 5/1993 | Walker et al. . |
| 5,215,435 | 6/1993 | Webb et al. . |
| 5,252,026 | 10/1993 | Shepherd . |
| 5,313,786 | 5/1994 | Chlus et al. . |
| 5,316,437 | 5/1994 | Czachor . |
| 5,472,313 | 12/1995 | Quinones et al. . |
| 5,545,004 | 8/1996 | Ho et al. . |
| 5,630,703 | 5/1997 | Hendley et al. ........................... 416/95 |
| 5,800,124 | 9/1998 | Zelesky ..................................... 416/95 |

FOREIGN PATENT DOCUMENTS

| | | | |
|---|---|---|---|
| 1942346 | 3/1971 | Germany | ................. 415/115 |
| 19810567 | 9/1998 | Germany . | |
| 1597376 | 9/1981 | United Kingdom . | |
| 2119027 | 9/1983 | United Kingdom . | |

*Primary Examiner*—Edward K. Look
*Assistant Examiner*—Liam McDowell
*Attorney, Agent, or Firm*—Jeffrey W. Astle

[57] ABSTRACT

A deflector for redirecting cooling air leakage to improve the efficiency of a gas turbine engine rotors. Adjacent rotor blades have a radially extending gap between each adjacent rotor blade and cooling air leaks into the gaps resulting in engine inefficiency. A deflector, disposed circumferentially on a forward face of the coverplate, deflects cooling air leakage, flowing from the running seal through the cooling air leakage path, away from the gaps between the blades, onto the outward surface of the blade platform, and into the gaspath at an acute angle relative to rearwardly axial flow. A forwardly extending flange deflects cooling air leakage forwardly around the blade platform lip.

6 Claims, 4 Drawing Sheets

DEFLECTOR FOR CONTROLLING ENTRY OF COOLING AIR LEAKAGE INTO THE GASPATH OF A GAS TURBINE ENGINE

BACKGROUND OF THE INVENTION

Conventional gas turbine engines are widely known to include means for bleeding off a portion of the airflow through the compressor to provide cooling air which is ducted through internal components and maintains such components cool relative to the hot annular gaspath. The cooling air is ducted through or over components to cool them and is directed further to be dispersed into the hot gaspath flow before being rearwardly expelled from the turbine engine.

The separation of internal cooling airflow and external gaspath flow is accomplished with running seals between stationary engine components and rotating assemblies. The running seals allow passage of a controlled leakage flow of cooling air in a leakage pathway between the stator and rotor assemblies to purge any hot gaspath air which would otherwise migrate into this area, and heat the adjacent internal components.

Conventionally the blades of the stators and rotors have platforms which step or overlap rearwardly to direct hot gaspath airflow axially rearwardly. This configuration has been relied upon conventionally to impede migration of hot airflow into the cooling air leakage pathway between the rotor and stator assemblies, and to direct cooling air leakage flow generally into the gaspath at an acute angle relative to rearwardly axial flow therein.

An example of such a conventional turbine coolant flow system is described in U.S. Pat. No. 3,609,057 to Radtke issued Sep. 28, 1971 and which can be considered well known to those skilled in the art.

In U.S. Pat. No. 5,211,533 to Walker et al, the reintroduction of cooling airflow passing by a running seal and into the compressor flow (upstream of the burners and gaspath) is controlled with a flow diverter. This diverter comprises a curved plate mounted forward of a stator blade and redirects cool airflow over the stator blade platform into the annular airflow passage within the turbine compressor section at an acute angle to the annular airflow direction.

When reintroducing the leaked cooling air towards a static blade there is no centrifugal force component to address and disturbance of the airflow within the annular passage is relatively low. Since rotor blades rotate at high angular speeds, for example 30,000 rpm, the effect of radial forces is substantial when considering reintroduction of cooling air.

In such an environment, the prior art either neglects to recognize the importance or does nor consider the effect of centrifugal forces on the reintroduced cooling air as in U.S. Pat. No. 3,609,057 to Radtke. Other approaches to this problem rely on improving seals or bypass the rotor area.

For example, U.S. Pat. No. 4,507,052 to Thompson uses six circumferential ridges on a running seal to better prevent leakage between the stator and rotor assemblies. A forward seal is used to prevent cooling air flow from the rear plenum and manifolds from merely passing through to the forward face of the rotor. However, no means is provided to prevent leakage air from passing through the six ridge running seal into gaps between the blade platforms and airfoils of adjacent blades. Such leakage air would enter the gaps between blades and be propelled radially into the gaspath by the centrifugal force of the rapidly rotating rotor blades.

Other examples of leakage air treatment involve use of a labyrinth to impede leakage air flow as in U.S. Pat. No. 5,252,026 to Shepherd, or use of labyrinth combined with bypass conduits as in U.S. Pat. No. 4,348,157 to Campbell et al.

However, none of the prior art methods of reintroducing cool leakage air back into the hot gaspath address the problem of cool air entering the gaps between rapidly rotating rotor blades and being expelled under centrifugal force into the gaspath in a transverse direction. It has been found by the inventors that such reintroduction significantly disturbs the gaspath flow and reduces engine efficiency.

SUMMARY OF THE INVENTION

The invention provides a deflector for redirecting cooling air leakage flowing between internal cooling or secondary air pathways and the primary annular hot gaspath, to improve the efficiency of a gas turbine engine.

A conventional gas turbine engine includes a forward stator assembly and a rotor assembly with an air cooled rotor disc, and a circumferential array of blade retention slots. An array of air cooled rotor blades with blade bases are retained in each slot. The rotor blades have blade platforms and blade airfoils radially extending outboard from the rotor disc into the hot annular gaspath.

The rotor blades are disposed equidistantly about the circumference of the rotor disc with a radially extending gap between each adjacent rotor blade. It is the significant detrimental effect of cooling air leakage into these gaps, which is the focus of this invention.

In some engine designs, such gaps can be substantial and conventional coverplates mounted on the rotor disc generally do not extend radially to adequately seal this area. Cooling air which leaks into these radial gaps has been recognized by the inventors as a significant source of gas turbine engine inefficiency.

The flow of leaking cooling air enters the gaps and due to the extremely high rotational speed of the rotor blades, is then expelled radially into the primary axial flow in the gaspath of the turbine engine. In effect the rotor blades act as an impeller to expel the leaking air radially transverse to the axial gaspath flow, thereby impeding and disturbing the gaspath flow.

Conventionally, the blade bases and slots define a plurality of forwardly open axial manifolds supplied with cool pressurized air from a disc plenum. Cooling air passes through the manifolds into various cooling passages in the rotor blades and is dispersed into the gaspath through orifices in the blade end and trailing edge. The cooling air plenum is defined between the forward face of the rotor disc and a circular coverplate which seals the cooling airflow path to the open manifolds.

The circular coverplate has an annular disc sealing edge engaging the rotor disc and blade bases, and an annular stator sealing edge forming running seal with the stator assembly for separating cooling air from the hot gaspath. A cooling air leakage path from the running seal to the gaspath is defined between the stator assembly, coverplate, rotor disc and rotor blades. A minimal amount of air is allowed by design to leak past the running seal and purge hot gaspath air from the leakage path in order to maintain the internal engine components at an optimum temperature cooler than that of the gaspath components.

The improvement of the invention relates to providing a deflector, disposed circumferentially on a forward face of the coverplate, for deflecting cooling air leakage, flowing from the running seal through the cooling air leakage path, away from the gaps between the blades, onto the outward surface of the blade platform, and into the gaspath at an acute angle relative to rearwardly axial flow therein.

Common rotor blades have a blade platform with a forward lip extending forwardly of the rotor disc and coverplate. In such cases, the cooling air leakage deflector comprises a forwardly extending flange for deflecting cooling air leakage forwardly around the blade platform lip.

Preferably the deflector is an annular ring with an L-shaped cross section in an axial plane with a forwardly extending deflector flange and a deflector base extending radially inwardly from the deflector flange. The deflector base is adapted for overlapping clamping engagement between the rotor disc and the disc sealing edge of the coverplate. This separate type of deflector can easily be retrofit during routine maintenance to improve the efficiency of existing gas turbine engines by sealing a significant portion of the gaps between rotor discs, rotor blade bases and rotor blade platforms.

Alternatively, the coverplate may be completely replaced with a modified coverplate including a deflector flange extending from the circumference of the coverplate. Further features of the invention and their benefits are described in detail below.

BRIEF DESCRIPTION OF THE DRAWINGS

In order that the invention be fully understood, a preferred embodiment of the invention will be described by way of example with reference to the accompanying drawings wherein.

DETAILED DESCRIPTION OF A PREFERRED EMBODIMENT

Figure 1:
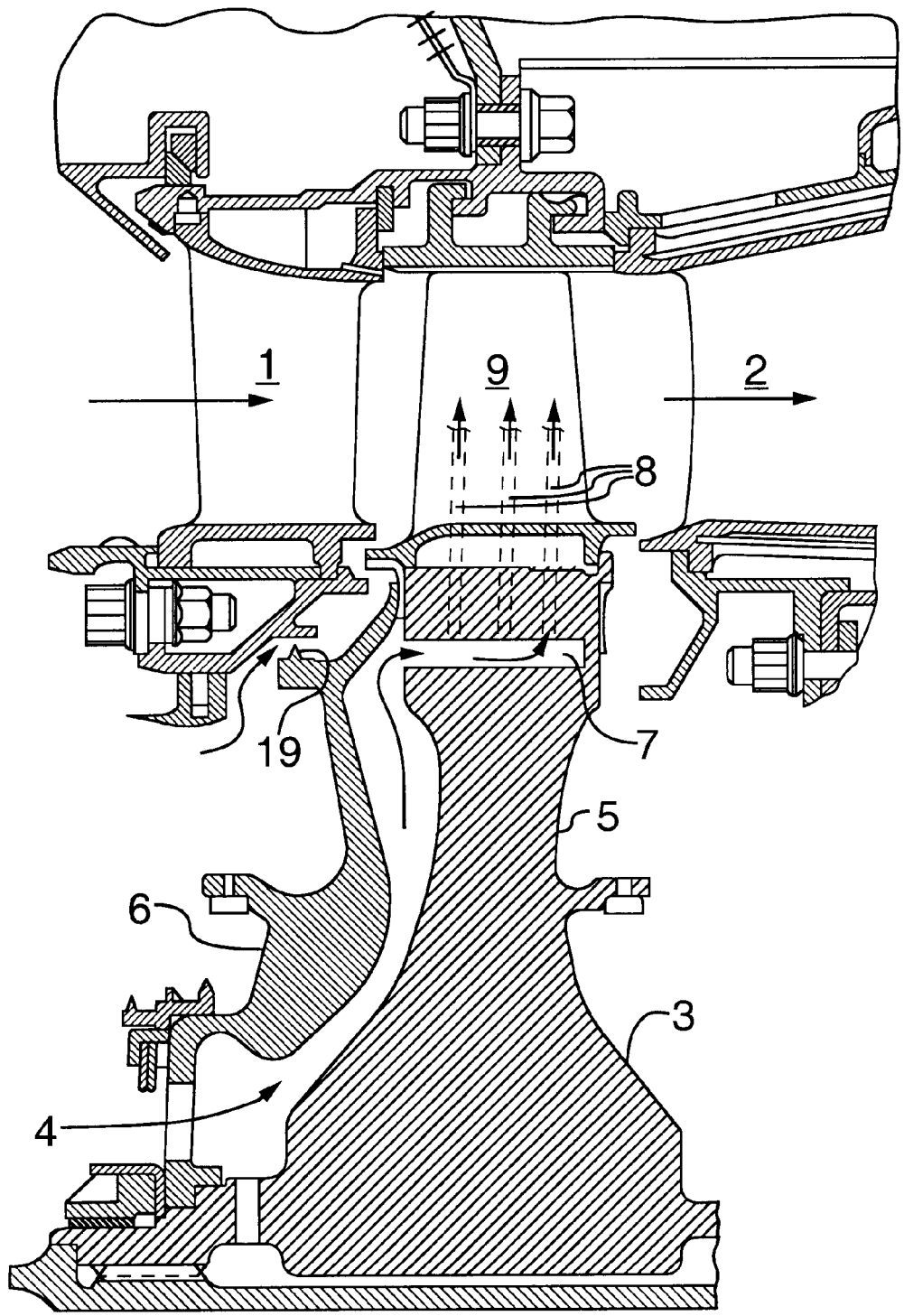
FIG. 1 is an axial sectional view through a typical gas turbine engine rotor and adjacent stator blades, with airflow from left to right, the gaspath being shown in the upper area of the drawing.

FIG. 1 shows the immediate environment within which the forward seal or deflector of the invention optimally interacts with other components of a conventional gas turbine engine, such as an aircraft engine. In order to understand the invention, of necessity the features of a conventional gas turbine engine are first briefly described below. It will be understood that although the invention is described in association with the turbine section of a turbine engine, the invention is equally applicable to any rotor such as the rotors of the compressor section.

FIG. 1 shows a partial axial section through the turbine section of a conventional gas turbine engine, with the invention included as a retrofit component. The turbine section includes forward and rearward stator blade assemblies 1 and 2 respectively, which generally define the gaspath and direct the hot gas axially in an annular flow as indicated by the arrows.

Figure 2:
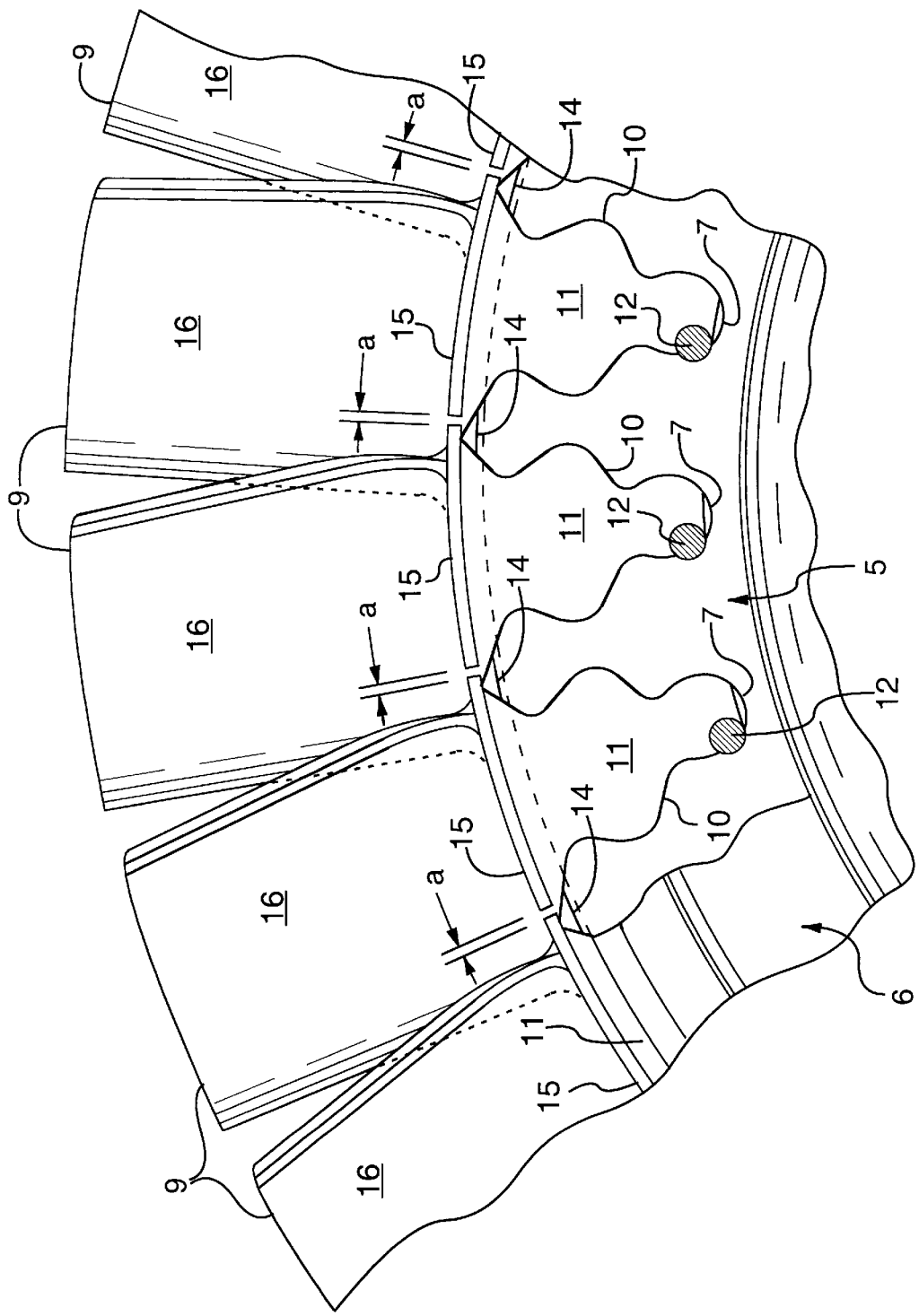
FIG. 2 is a prior art frontal view of a segment of the rotor showing details of the fir tree blade bases and blade retention slots within the periphery of the rotor disc, with the coverplate broken away.

FIG. 2 in conjunction with FIG. 1 reveal details of the rotor assembly. The rotor assembly 3 is axially symmetric about the axis of rotation with internal components being air cooled by secondary air 4 bled from the engine compressor section (not shown). The central rotor disc 5 has a forwardly mounted coverplate 6 which contains and directs cooling air. Cooling air 4 flows radially outward between the coverplate 6 and rotor disc 5 into manifolds 7 then through internal passages 8 formed in the blades 9. The passages 8 lead to a series of orifices in the trailing edge of the blade 9 and in the outer end of the blade 9 which reintroduce and disperse the cooling air flow 4 into the hot gas flow of the gaspath.

Best seen in FIG. 2, the rotor disc 5 includes a circumferential array of blade retention slots 10 and air cooled rotor blades 9 with blade bases 11 retained in each one of the slots 10, commonly known as fir tree. Rivets 12 and a rearward circumferential shoulder 13 (see FIG. 4 detail) are used to secure the blades 9 to the rotor disc 5.

Figure 4:
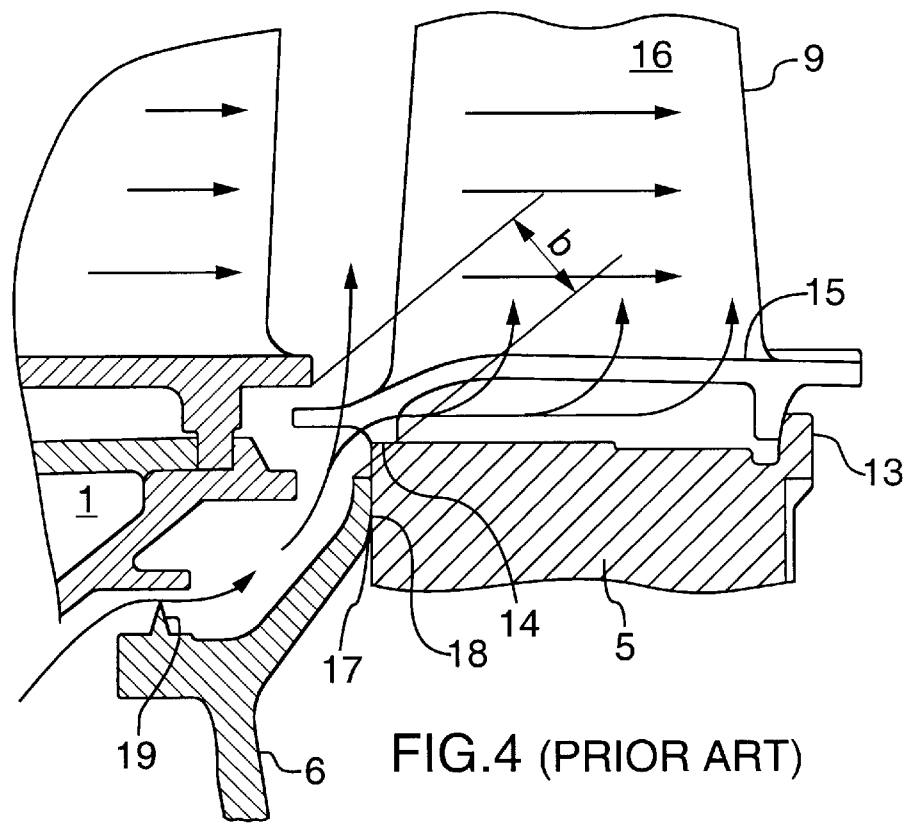
FIG. 4 is a prior art detail axial sectional view through the cooling air leakage path from the running seal to the gaspath, showing the infiltration of cooling air leakage into gaps between the blade platforms and expulsion a under centrifugal force into the gaspath.

As indicated in FIG. 2 and 4, the coverplate 6 covers almost the entire forward surface of the rotor disc 5, except a narrow circular band about the radially outward extremity. The coverplate 6 engages the rotor disc 5 slightly inward from the forward radially outward edge 14 of the disc 5. The rotor blades 9 have blade platforms 15 and blade airfoils 16 radially extending outboard of the disc 5 into the hot annular gaspath. The rotor blades 9 are disposed equidistantly about the circumference of the rotor disc 5.

Figure 3:
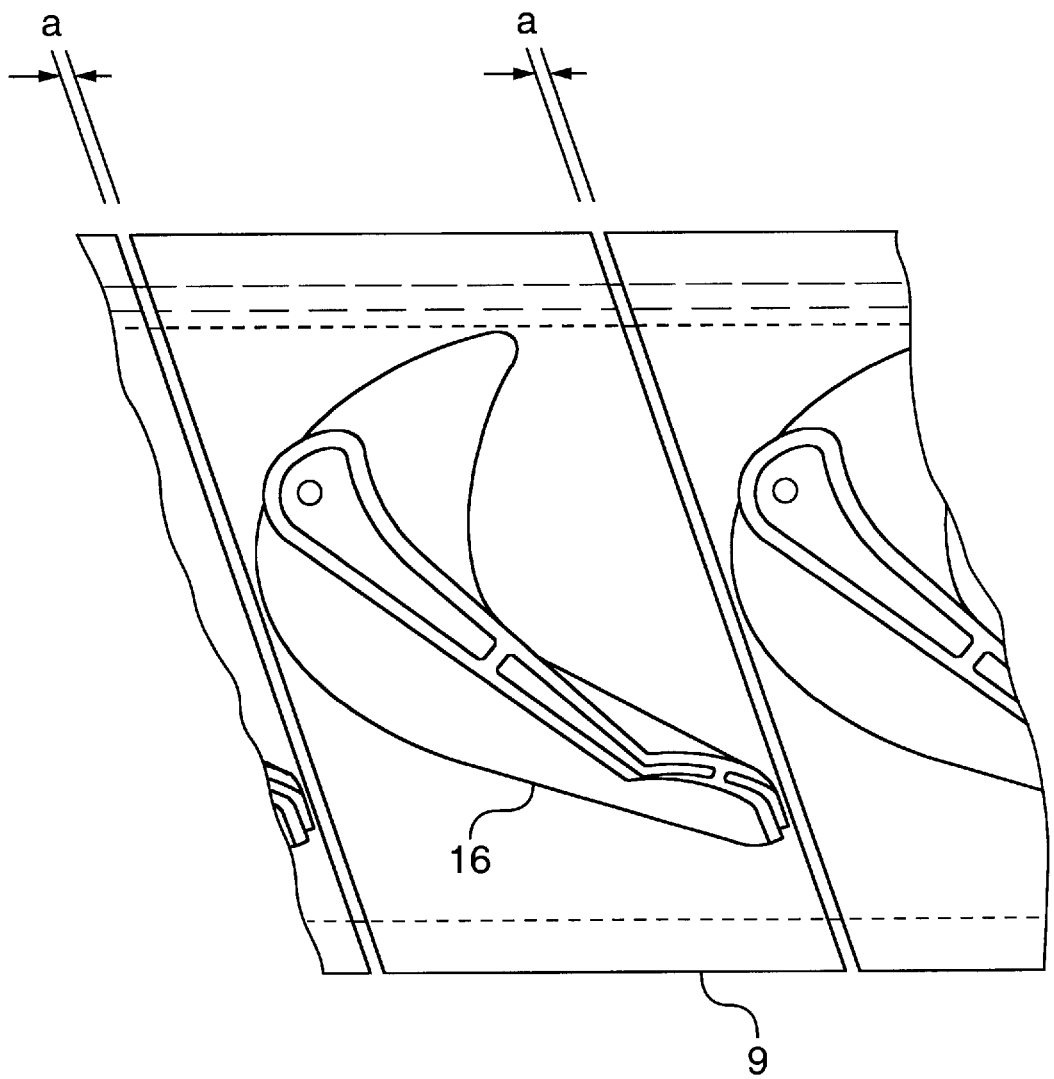
FIG. 3 is a radial plan view of the blades in particular showing the gaps between adjacent blade platforms.

Due to the need to accommodate thermal expansion and contraction there is a radially extending gap of dimension "a" between the edges of platforms 15 of each adjacent rotor blade 9, as best seen in FIG. 3. It is the aerodynamic effect of this gap "a" that is the focus of the invention and the cause of the problem with conventional gas turbine engine designs that the invention addresses.

As shown in FIG. 1, and detail of FIG. 4, the circular coverplate 6 engages the rotor disc 5 with a planar annular disc sealing edge 17 clamped to the planar forward surface 18 of the rotor disc S. The coverplate 6 substantially covers the blade bases 11 radially inward a distance from the disc forward edge 14.

Seen in FIGS. 1 and 4, the coverplate 6 has an annular stator sealing edge 19 forming running seal with the forward stator assembly 1 for separating internal cooling air from the hot outer annular gaspath. The sealing edge 19 does not provide a complete air tight seal but merely represents a flow restriction, like a partially open valve. The flow restriction increases resistance to flow from the cooling air system to the hot gaspath thereby maintaining air pressure in the secondary cooling system, and preventing excessive backflow or mixing between the cooling air and the hot gaspath air.

A controlled amount of cooling air is permitted to pass the sealing edge 19 and to re-enter the gaspath via a labyrinth cooling air leakage path, illustrated in FIG. 4. Cooling air leakage progresses from the running seal 19 to the gaspath between the stator assembly 1, forward surface of the coverplate 6, rotor disc 5 and rotor blade platforms 15. This cooling air leakage flows through the labyrinth leakage path to purge hot gaspath air and moderate the temperature of adjacent components. Without the purging action of the leakage flow therefore, the hot gaspath air would migrate into the area between the stator and rotor assemblies upstream of the sealing edge 19, to the detriment of the cooling system.

As indicated in FIG. 2, in addition to the gap "a", there is a truncated triangular shaped gap radially in communication with gap "a" defined between forward edge 14 of the rotor disc 5, and the lateral edges of the blade bases 11, immediately inward of the blade platforms 15. This truncated triangular gap is formed due to the relieving of the forward edge 14 during machining, to produce a rearward retaining shoulder 13 (see FIG. 4) of adequate radial height to accomplish the task of securing the blade 9 to the rotor disc 5.

The truncated triangular gap and gap "a" provide an unintended path through which leakage cooling air enters the gaspath, as indicated by arrows in FIG. 4. The leakage cooling air passing through the leakage path beyond the coverplate 6 is presented with a significant opening toward the gaspath. This opening is defined by dimension "b" in an axial plane, and in the transverse plane by the combined shape of gap "a" together with the truncated triangular gap that acts as an axial manifold to convey air rearwardly.

The volume of cooling air passing through the leakage path is conventionally considered to be insignificant, however, the inventors have discovered that significant inefficiencies are introduced when cooling leakage air is introduced into the gaspath as described above. Of course when considering the entire circumference of the rotor blade assembly 3, gap "a" is very small relative to the blade platforms. The extremely high rotational speed of the rotor assembly 3 is a significant factor not immediately apparent when viewing a two dimensional drawing.

At high rotational speeds, the rotor blades 9 act in effect as an impeller to propel the leakage air flow centrifugally. The leakage air flow is propelled transverse to the axial flow of air in the gaspath. The collision between the leakage air flow and gaspath flow disturbs the gaspath flow creating significant inefficiency in the engine. The impeller action of the rotor blades 9 creates a vacuum drawing more leakage cooling air past the sealing edge 19 than is required for the hot air purging function.

The inventors have recognized the importance of better controlling the reintroduction of leakage cooling air into the gaspath. Two major parameters which effect the re-entry of leakage air are the quantity of flow and the direction of flow relative to the gaspath flow direction. Ideally the quantity is maintained at the minimal level required to purge hot air from the cooling air leakage path between the rotor and stator assemblies. Ideally the leakage air is merged into the gaspath at an acute angle with as little disturbance as possible.

Figure 5:
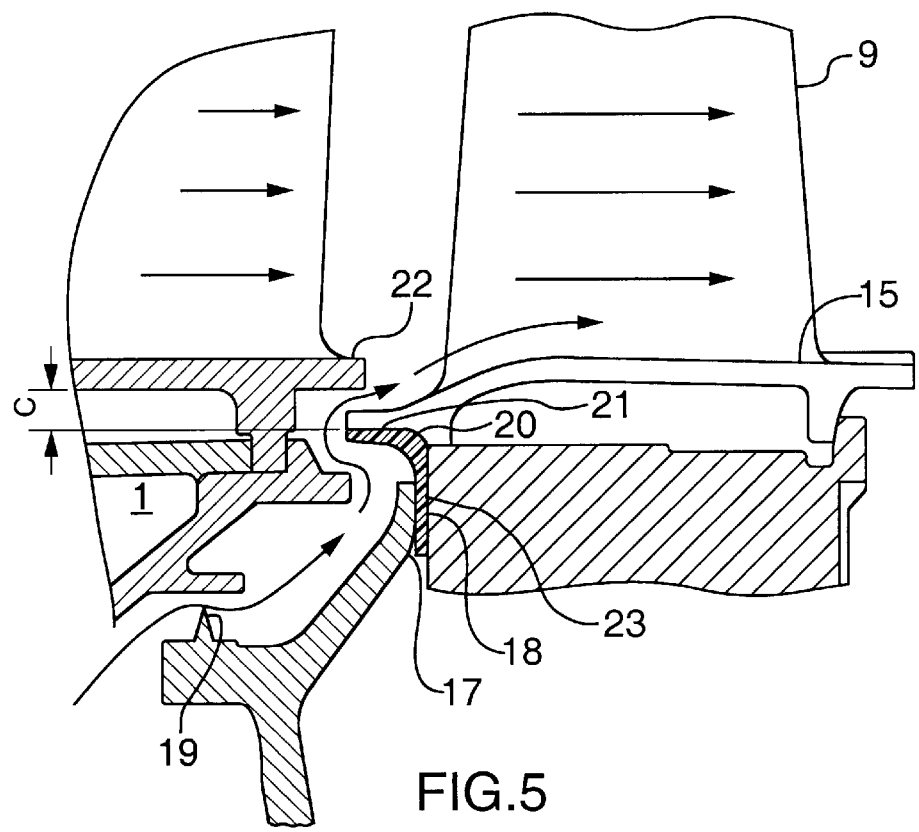
FIG. 5 is a like sectional view with the deflector installed and clamped between the coverplate and the rotor disc, showing the deflection of cooling air around the blade platform and reintroduced into the gaspath at an acute angle to the gaspath flow.

The invention in a preferred embodiment is best shown in FIG. 5 in the form of an L-shaped annular ring 20 disposed circumferentially about the forward face of the is coverplate 6. The embodiment shown is applicable to new engines and for retrofitting the ring 20 to existing engines during routine maintenance. An alternative embodiment may include extending the coverplate 6 radially a rearwardly extending flange 21.

As indicated with arrows in FIG. 5, the ring 20 deflects cooling air leakage, flowing from the running seal 19 through the cooling air leakage path, away from the gaps between the blades 9, onto an outward surface of the blade platform 15, and into the gaspath at an acute angle relative to rearwardly axial flow therein.

The ring 20 covers the truncated triangular gaps and a significant portion of gap "a" between adjacent blade plat-forms 15. The available width of pathway for air flow is reduced from dimension "b", in FIG. 4 to dimension "c" in FIG. 5, thereby restricting flow and reducing the quantity of air passing.

Further, the flange 21 in conjunction with a stator blade platform 22 defines a rearwardly open nozzle to merge leakage cooling air smoothly into the gaspath with minimal disturbance. Gaspath air flow over the stator platform 22 and rotor blade platform 15 tends to suck the leaking cooling air into the gaspath flow due to the Venturi effect, and further enhances smooth re-entry and purging.

Rotor blades 9 commonly include a blade platform 15 having a forward lip extending forwardly of the rotor disc 5 and coverplate 6. The cooling air leakage deflection ring 21 includes a forwardly extending flange 21 which deflects cooling air leakage forwardly around the blade platform lip.

The flange 21 redirects air forwardly away from the gaps "a". The stator platform 22 then redirects air rearwardly over the blade platforms 15. Such improved air flow control enhances the labyrinth effect that better separates hot gaspath air from the cooling air system, and directs cooling air over the blade platforms 15. Both effects improve the cooling of internal components inward of the gaspath thereby reducing thermally induced stress and increasing service life.

In the embodiment shown the deflector ring 20 includes a deflector base 23 extending radially inwardly from the deflector flange 21. The defector base 23 is flat and adapted for overlapping clamping engagement between the planar surface 18 of the rotor disc 5 and the planar disc sealing edge 17 of the coverplate 6. An alternative embodiment may include extending the coverplate 6 radially and including a rearwardly extending flange 21, however in both cases the flange 21 is contiguous with the disc sealing edge 17 of the coverplate 6. The base 23 of the deflector ring 20 is secured without bolts or other fasteners by clamping under the coverplate 6. The coverplate is secured to the engine shaft in a conventional manner and in effect acts as a belleville washer compressing the ring 20 into engagement with the rotor disc 5.

The flange 21 is subjected to high circumferential and thermal forces in operation. To withstand these forces, the thickness of the flange 21 is tapered with decreasing thickness forwardly as illustrated in FIG. 5. The flange 21 at rest may be disposed at a distance radially inward from the underside surface of the blade platforms 15, since under the centrifugal force and heat induced expansion experienced during operation the flange 21 is displaced radially outward into engagement with the rotor blade platforms 15. The deflector ring 20 preferably is constructed from a nickel alloy, such as waspalloy, to withstand the extreme conditions adjacent to the hot gaspath.

Although the invention has been described with reference to a preferred embodiment, it will be understood that the scope of the invention includes all equivalent elements and materials.

What is claimed is:

1. In a gas turbine engine including a forward stator assembly and a rotor assembly having:

an air cooled rotor disc with an axis, a forward radially outward edge, and a circumferential array of blade retention slots;

a plurality of air cooled rotor blades with blade bases retained in each one of said slots, the rotor blades having blade platforms and blade airfoils radially extending outboard of the disc into a hot annular gaspath, the rotor blades disposed equidistantly about the circumference of the rotor disc with a radially extending gap between each adjacent rotor blade;

a circular coverplate having: an annular disc sealing edge engaging the rotor disc and blade bases radially inward of the disc forward edge; and an annular stator sealing edge forming running seal means with the stator assembly for separating cooling air from the hot gaspath;

a cooling air leakage path from the running seal means to the gaspath being defined between the stator assembly, coverplate, rotor disc and rotor blades;

wherein the improvement comprises:

cooling air leakage deflection means extending circumferentially from the coverplate, for deflecting cooling air leakage, flowing from the running seal through the cooling air leakage path, away from the gaps between the blades and for deflecting cooling air leakage forwardly around the blade platform lip, onto an outward surface of the blade platform, and into the gaspath at an acute angle relative to rearwardly axial flow therein, wherein the cooling air leakage deflection means comprise a forwardly extending deflector flange contiguous with the disc sealing edge of the coverplate.

2. A deflector according to claim 1 comprising a nickel alloy.

3. A deflector according to claim 2 comprising waspalloy.

4. A deflector according to claim 1 further comprising a deflector base extending radially inwardly from the deflector flange, the defector base adapted for overlapping clamping engagement between the rotor disc and the disc sealing edge of the coverplate.

5. A deflector according to claim 4 wherein the flange is tapered with decreasing thickness forwardly.

6. A deflector according to claim 4 wherein the flange at rest is disposed at a distance radially inward from an underside surface of the blade platforms.

* * * * *